US012602199B2

(12) United States Patent
Shiraishi et al.

(10) Patent No.: US 12,602,199 B2
(45) Date of Patent: *Apr. 14, 2026

(54) REGISTRATION APPARATUS, REGISTRATION METHOD, AND NON-TRANSITORY STORAGE MEDIUM WITH AUDIO OUTPUT FOR PRODUCTS IMAGED AND SENSED BY ANY OF SIZE AND KIND

(71) Applicant: NEC Corporation, Tokyo (JP)

(72) Inventors: Soma Shiraishi, Tokyo (JP); Kota Iwamoto, Tokyo (JP); Hideo Yokoi, Tokyo (JP); Tsugunori Takata, Tokyo (JP); Emi Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,799

(22) Filed: Jul. 13, 2023

(65) Prior Publication Data

US 2023/0359434 A1     Nov. 9, 2023

Related U.S. Application Data

(63) Continuation of application No. 16/970,781, filed as application No. PCT/JP2018/006717 on Feb. 23, 2018, now Pat. No. 12,032,873.

(51) Int. Cl.
*G06K 9/00*          (2022.01)
*G06F 3/16*          (2006.01)
(Continued)

(52) U.S. Cl.
CPC ............... *G06F 3/167* (2013.01); *G06F 3/16* (2013.01); *G06Q 20/208* (2013.01); *G06V 20/52* (2022.01)

(58) Field of Classification Search
CPC .. G07G 1/0063; G07G 1/0036; G06F 3/0482; G06F 3/167; G06F 3/16; G06V 20/52; G06Q 20/208
See application file for complete search history.

(56) References Cited

U.S. PATENT DOCUMENTS 5,115,888  A      5/1992  Schneider ............ G06Q 20/208
                                                            235/383
6,471,125  B1    10/2002  Addy
                (Continued)

FOREIGN PATENT DOCUMENTS

JP          2004127013  A   *   4/2004
JP          2007-255761  A      10/2007
                (Continued)

OTHER PUBLICATIONS

International Search Report of PCT/JP2018/006717 dated May 22, 2018 [PCT/ISA/210].
(Continued)

*Primary Examiner* — Gregory A Morse
*Assistant Examiner* — Kevin M Coomber
(74) *Attorney, Agent, or Firm* — Sughrue Mion, PLLC

(57) ABSTRACT

The invention addresses the problem of improving labor of a registration operation of a product and enabling a checkout operator to recognize a recognition result. In order to solve the problem, the invention provides a registration apparatus (10) including: an image acquisition unit (11) that acquires an image obtained by imaging a placement surface of a table, on which a product is placed; an analysis unit (12) that recognizes the product included in the image, a registration unit (14) that registers the recognized product as a checkout target, and an output unit (13) that outputs a name of the recognized product by voice.

17 Claims, 11 Drawing Sheets

(51) Int. Cl.
    *G06Q 20/20*     (2012.01)
    *G06V 20/52*     (2022.01)

(56)         References Cited

U.S. PATENT DOCUMENTS

| | | | | |
|---|---|---|---|---|
| 9,595,029 | B1 | 3/2017 | Catoe | G07G 1/0036 |
| 2009/0254342 | A1 | 10/2009 | Buck et al. | |
| 2015/0193759 | A1* | 7/2015 | Fukuda | G07G 1/0009 |
| | | | | 705/23 |
| 2016/0012404 | A1 | 1/2016 | Burton | |
| 2018/0165625 | A1* | 6/2018 | Modi | G06F 16/90332 |
| 2020/0202177 | A1 | 6/2020 | Buibas | G06V 10/764 |

FOREIGN PATENT DOCUMENTS

| | | | | |
|---|---|---|---|---|
| JP | 2009058236 A | * | 3/2009 | |
| JP | 2014149863 A | | 8/2014 | G07G 1/0063 |
| JP | 2016-062545 A | | 4/2016 | |
| JP | 2016-115113 A | | 6/2016 | |
| JP | 2016-173657 A | | 9/2016 | |
| JP | 2016-177433 A | | 10/2016 | |
| JP | 6008405 B2 | * | 10/2016 | |
| JP | 2017220206 A | * | 12/2017 | |
| WO | 2015/098189 A1 | | 7/2015 | |
| WO | WO-2016158595 A1 | * | 10/2016 | G06K 7/10762 |
| WO | 2017/126253 A1 | | 7/2017 | |
| WO | 2018/016214 A1 | | 1/2018 | |

OTHER PUBLICATIONS

Japanese Office Action for JP Application No. 2020-501953 mailed on Jul. 20, 2021 with English Translation.
US Office Action for U.S. Appl. No. 16/970,781, mailed on Dec. 26, 2023.
JP Office Action for JP Application No. 2023-007911, mailed on Oct. 17, 2023 with English Translation.
US Office Action for U.S. Appl. No. 18/221,791, mailed on Jan. 8, 2026.
Thatcher, J, "Screen reader/2 access to OS/2 and the graphical user interface", In Proceedings of the first annual ACM conference on assistive technologies, pp. 39-46, 1994.
US Notice of Allowance for U.S. Appl. No. 18/221,667 , mailed on Feb. 24, 2026.

* cited by examiner

FIG. 10

VOICE PROCESSING TARGET
(FIRST LIST)

| PRODUCT ID |
|:---:|
| 12345678 |
| 12345666 |
| · · · · · · · · |

FIG. 11

NON-VOICE PROCESSING TARGET
(SECOND LIST)

| PRODUCT ID |
|------------|
| 22334455 |
| 22334466 |
| . . . . . . |

REGISTRATION APPARATUS, REGISTRATION METHOD, AND NON-TRANSITORY STORAGE MEDIUM WITH AUDIO OUTPUT FOR PRODUCTS IMAGED AND SENSED BY ANY OF SIZE AND KIND

CROSS REFERENCE TO RELATED APPLICATIONS

This application is a Continuation of U.S. application Ser. No. 16/970,781, filed Aug. 18, 2020, which is a National Stage of International Application No. PCT/JP2018/006717, filed Feb. 23, 2018.

TECHNICAL FIELD

The present invention relates to a registration apparatus, a registration method, and a program.

BACKGROUND ART

Patent Document 1 discloses a product registration apparatus that recognizes a product through image analysis and registers the product.

Patent Document 2 discloses a display control apparatus that decides a display region of a display object displayed on a display surface according to information of a real object on the display surface. The display control apparatus can recognize a type of tableware placed on a dining table and can output a display effect and sound according to the type.

Patent Document 3 discloses an information processing apparatus that images one product held over a reading window, analyzes the image to recognize the product, registers the recognized product, and outputs a product name of the recognized product by voice.

RELATED DOCUMENT

Patent Document

[Patent Document 1] Japanese Unexamined Patent Publication No. 2016-62545

[Patent Document 2] International Publication No. WO2015/098189

[Patent Document 3] Japanese Unexamined Patent Publication No. 2014-149863

SUMMARY OF THE INVENTION

Technical Problem

In the technique for recognizing a product through image analysis and registering the product, a salesperson or a customer is likely to feel uneasy about whether or not the product is correctly recognized. A method of holding the product over the reading window one by one, as the technique disclosed in Patent Document 3, is little different from an existing method of making a reader read a product code of each product, from a viewpoint of labor of a checkout operator. The invention addresses the problem of improving labor of a registration operation of a product and enabling a checkout operator to recognize a recognition result.

Solution to Problem

According to the invention, there is provided a registration apparatus including:

an image acquisition unit that acquires an image obtained by imaging a placement surface of a table, on which a product is placed;

an analysis unit that recognizes the product included in the image;

a registration unit that registers the recognized product as a checkout target; and an output unit that outputs a name of the recognized product by voice.

According to the invention, there is provided a registration method executed by a computer, the method including:

an image acquisition step of acquiring an image obtained by imaging a placement surface of a table, on which a product is placed;

an analysis step of recognizing the product included in the image;

a registration step of registering the recognized product as a checkout target; and an output step of outputting a name of the recognized product by voice.

According to the invention, there is provided a program that causes a computer to function as:

an image acquisition unit that acquires an image obtained by imaging a placement surface of a table, on which a product is placed;

an analysis unit that recognizes the product included in the image;

a registration unit that registers the recognized product as a checkout target; and an output unit that outputs a name of the recognized product by voice.

Advantageous Effects of Invention

According to the invention, labor of a registration operation of a product can be reduced, and a checkout operator can recognize a recognition result.

BRIEF DESCRIPTION OF THE DRAWINGS

The above-described object and other objects, features, and advantages will become apparent from preferable example embodiments described below and the accompanying drawings.

FIG. 10 is a diagram schematically showing an example of information that is processed by the registration apparatus of the present example embodiment.

FIG. 11 is a diagram schematically showing an example of information that is processed by the registration apparatus of the present example embodiment.

DESCRIPTION OF EMBODIMENTS

First Example Embodiment

First, the outline of a registration apparatus of the present example embodiment will be described. The registration apparatus of the present example embodiment is used for checkout processing at a store that sells products. The registration apparatus may be a so-called point of sales (POS) register. The registration apparatus may be an apparatus on the premise of being operated by a salesperson or may be an apparatus on the premise of being operated by a customer.

In the checkout processing using the registration apparatus, a table on which a product to be a target of the checkout processing is placed, and a camera that images a placement surface of the table are prepared. In the checkout processing, a checkout operator (salesperson, customer, or the like) places a product to be a checkout target on the placement surface of the table. In a case where an image generated by the camera is acquired, the registration apparatus analyzes the image and recognizes the product included in the image. Then, the registration apparatus registers the recognized product as the product to be a checkout target. The registration apparatus outputs a name of the recognized product by voice.

With the registration apparatus of the present example embodiment that outputs the name of the recognized product by voice, the checkout operator can recognize that the product is recognized and a recognition result, based on voice output from the registration apparatus. Furthermore, with the registration apparatus of the present example embodiment that recognizes and registers the product included in the image obtained by imaging the table on which the product is placed, a plurality of products can be placed on the table at a time and can be recognized and registered. As a result, operation efficiency is improved compared to a technique for holding products over a reading window and imaging the products one by one or for making a code reader read a code attached to each product.

Next, the configuration of the registration apparatus of the present example embodiment will be described in detail. First, an example of the hardware configuration of the registration apparatus will be described. Functions provided in the registration apparatus are implemented by any combination of hardware and software of any computer centering on a central processing unit (CPU), a memory, a program loaded on the memory, a storage unit (capable of storing programs stored in advance at the time of shipment of the apparatus as well as programs downloaded from a storage medium, such as a compact disc (CD), or a server on the Internet), such as a hard disk that stores the program, and an interface for network connection. In addition, those skilled in the art can understand that various modification examples can be made to the implementation method and the apparatus.

Figure 1:
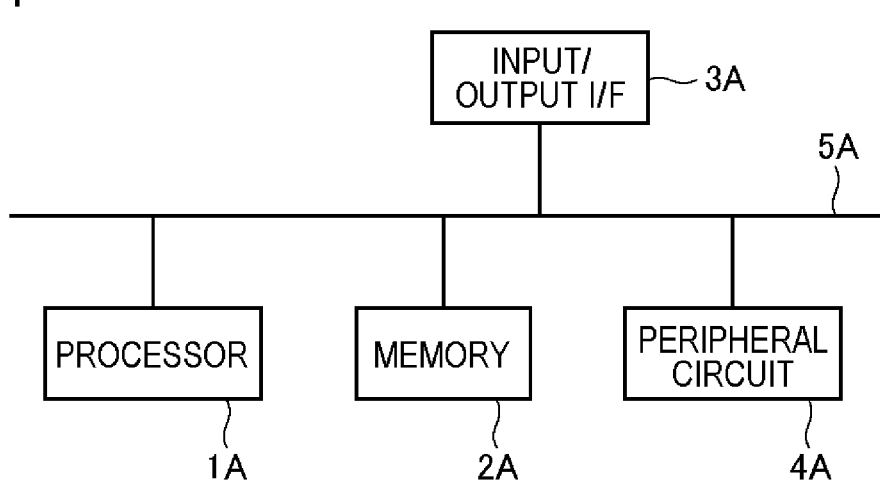
FIG. 1 is a diagram showing an example of the hardware configuration of a registration apparatus of the present example embodiment.

FIG. 1 is a block diagram illustrating the hardware configuration of the registration apparatus. As shown in FIG. 1, the registration apparatus has a processor 1A, a memory 2A, an input/output interface 3A, a peripheral circuit 4A, and a bus 5A. In the peripheral circuit 4A, various modules are included. It should be noted that the peripheral circuit 4A may not be provided.

The bus 5A is a data transmission path through which the processor 1A, the memory 2A, the peripheral circuit 4A, and the input/output interface 3A transmit and receive data to and from one another. The processor 1A is, for example, an arithmetic processing unit, such as a central processing unit (CPU) or a graphics processing unit (GPU). The memory 2A is, for example, a memory, such as a random access memory (RAM) or a read only memory (ROM). The input/output interface 3A includes an interface through which information is acquired from an input apparatus (for example: a keyboard, a mouse, a microphone, or the like), an external apparatus, an external server, or an external sensor, an interface through which information is output to an output apparatus (for example: a display, a speaker, a printer, an emailer, or the like), an external apparatus, or an external server, and the like. The processor 1A can issue a command to each module and performs an arithmetic operation based on the arithmetic results of the modules.

Figure 2:
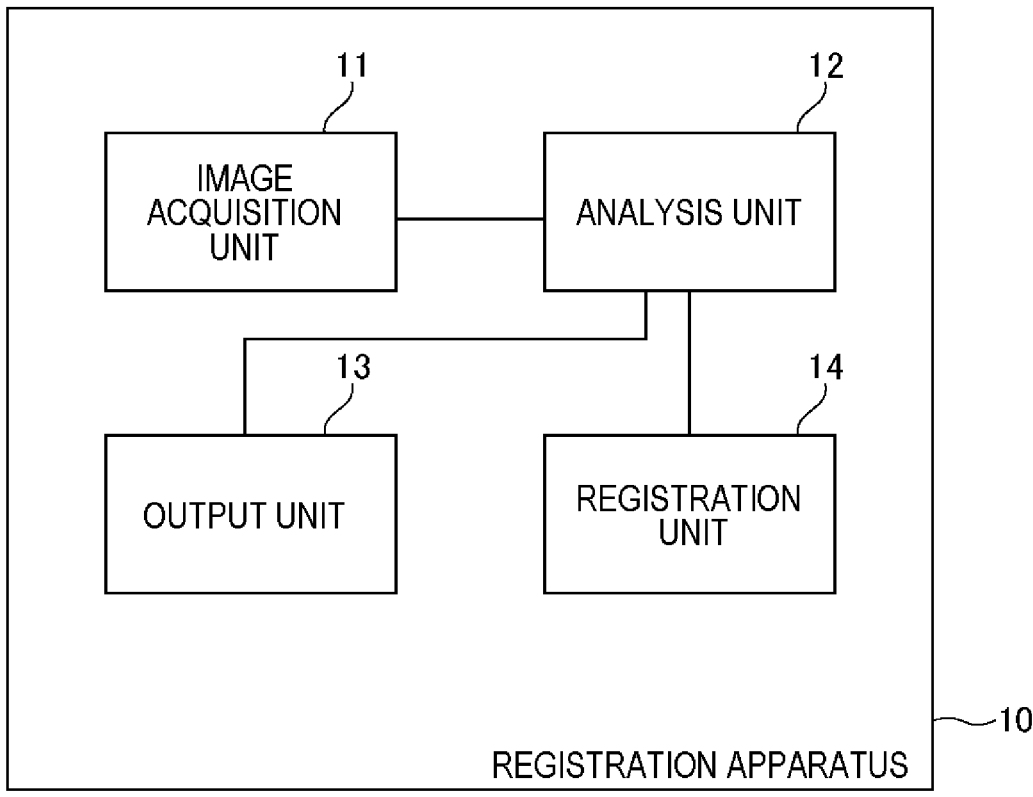
FIG. 2 is a diagram showing an example of a functional block diagram of the registration apparatus of the present example embodiment.

FIG. 2 shows an example of a functional block diagram of a registration apparatus 10. As shown in the drawing, the registration apparatus 10 has an image acquisition unit 11, an analysis unit 12, an output unit 13, and a registration unit 14.

The image acquisition unit 11 acquires an image obtained by imaging the placement surface of the table on which a product is placed. As described above, in the checkout processing using the registration apparatus 10, the table on which the product to be a target of the checkout processing is placed, and the camera that images the placement surface of the table are prepared. The image acquisition unit 11 acquires an image generated by the camera. The camera may generate a moving image (a plurality of images), and the image acquisition unit 11 may acquire the moving image from the camera.

Figure 3:
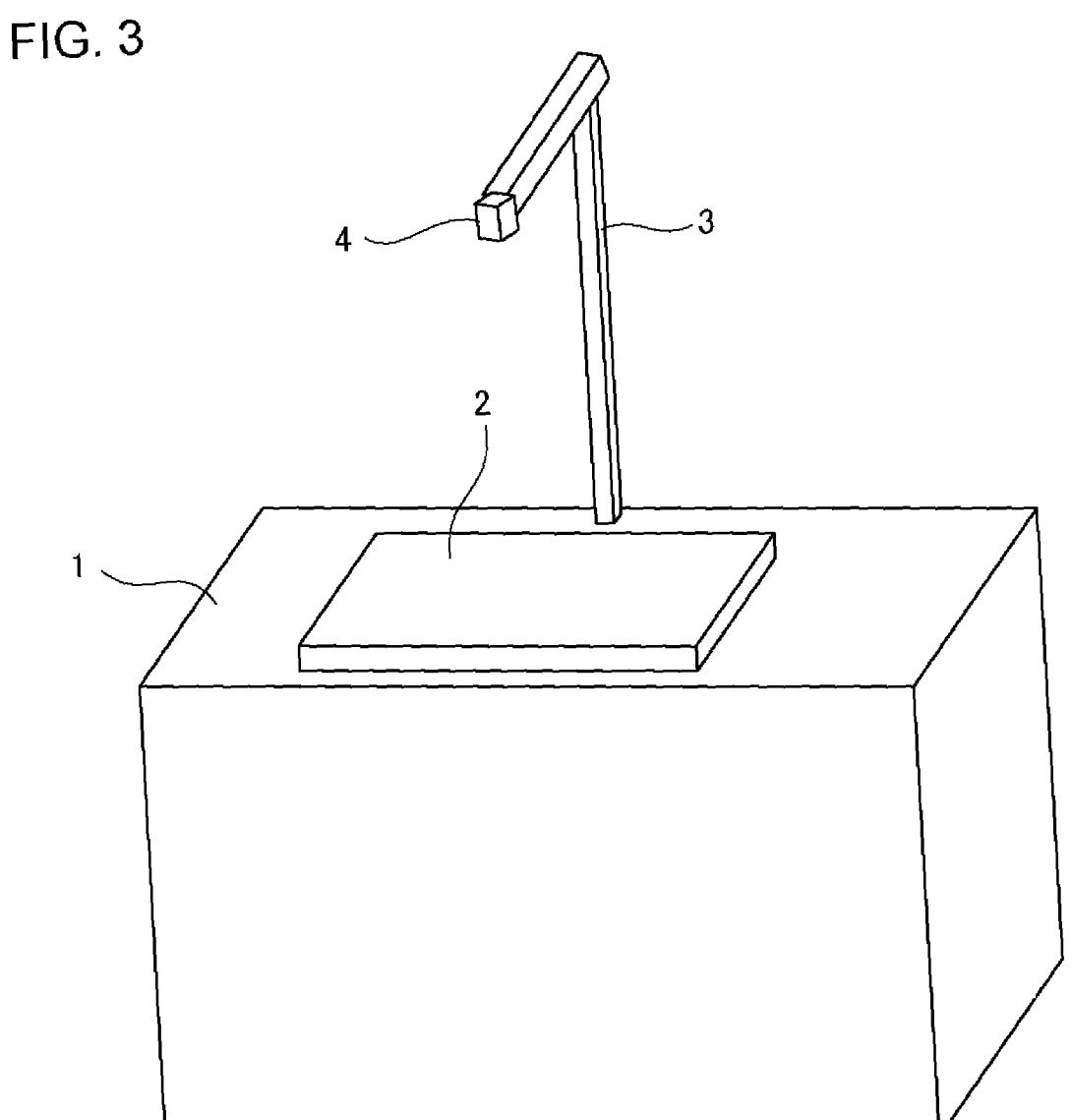
FIG. 3 is a diagram schematically showing a camera and a table that are used in checkout processing using the registration apparatus of the present example embodiment.

FIG. 3 schematically shows an example of the table and the camera. In the drawing, a table 1, a member 2, a support pillar 3, and a camera 4 are shown. The member 2 is positioned on an upper surface of the table 1 and forms a part of the table 1. An exposed surface of the member 2 is a placement surface on which a product is placed. It should be noted that the member 2 may be a display or may be other members. The camera 4 is attached to the support pillar 3 and images the exposed surface of the member 2 from above. An image generated by the camera 4 is transmitted to the registration apparatus 10 (not shown) through communication in a wired or wireless manner.

Returning to FIG. 2, the analysis unit 12 analyzes the image acquired by the image acquisition unit 11 and recognizes the product included in the image. The analysis unit 12 can recognize the product using a pattern matching technique or the like.

For example, the analysis unit 12 detects an object included in the image (object detection) using techniques, such as image binarization and contour extraction. Thereafter, the analysis unit 12 collates a feature (a feature of a region where the object in the image is present) of an appearance of the detected object appearing in the image with a feature (reference information) of an appearance of each of a plurality of products registered in advance, thereby identifying what product the object is (product recognition). For example, the analysis unit 12 may perform identification as a product of which similarity in appearance to the object is the highest, or a product of which similarity in appearance to the object is the highest and is equal to or greater than a reference value. As the feature of the appearance of the product, although a color, surface roughness, a shape, or the like is exemplified, the invention is not limited thereto.

The registration unit 14 registers the product recognized by the analysis unit 12. For example, the registration unit 14 acquires product information of the product recognized by the analysis unit 12 from a product master and registers at least a part of the acquired product information in the registration apparatus 10. The product information includes a price, a product name, a product code, and the like.

The output unit 13 outputs a name of the product recognized by the analysis unit 12 by voice. For example, in a case where the name (for example: the name acquired from the product master) of the product recognized by the analysis unit 12 is acquired, the output unit 13 may generate voice data of the name of the product using a voice synthesis technique. Then, the output unit 13 may reproduce the generated voice data, thereby outputting the name of the product by voice.

In addition, voice data of the name of the product may be registered in advance in the registration apparatus 10 for each product. Then, the output unit 13 may extract and reproduce voice data of the name of the product recognized by the analysis unit 12 from among the registered voice data, thereby outputting the name of the product by voice.

Figure 4:
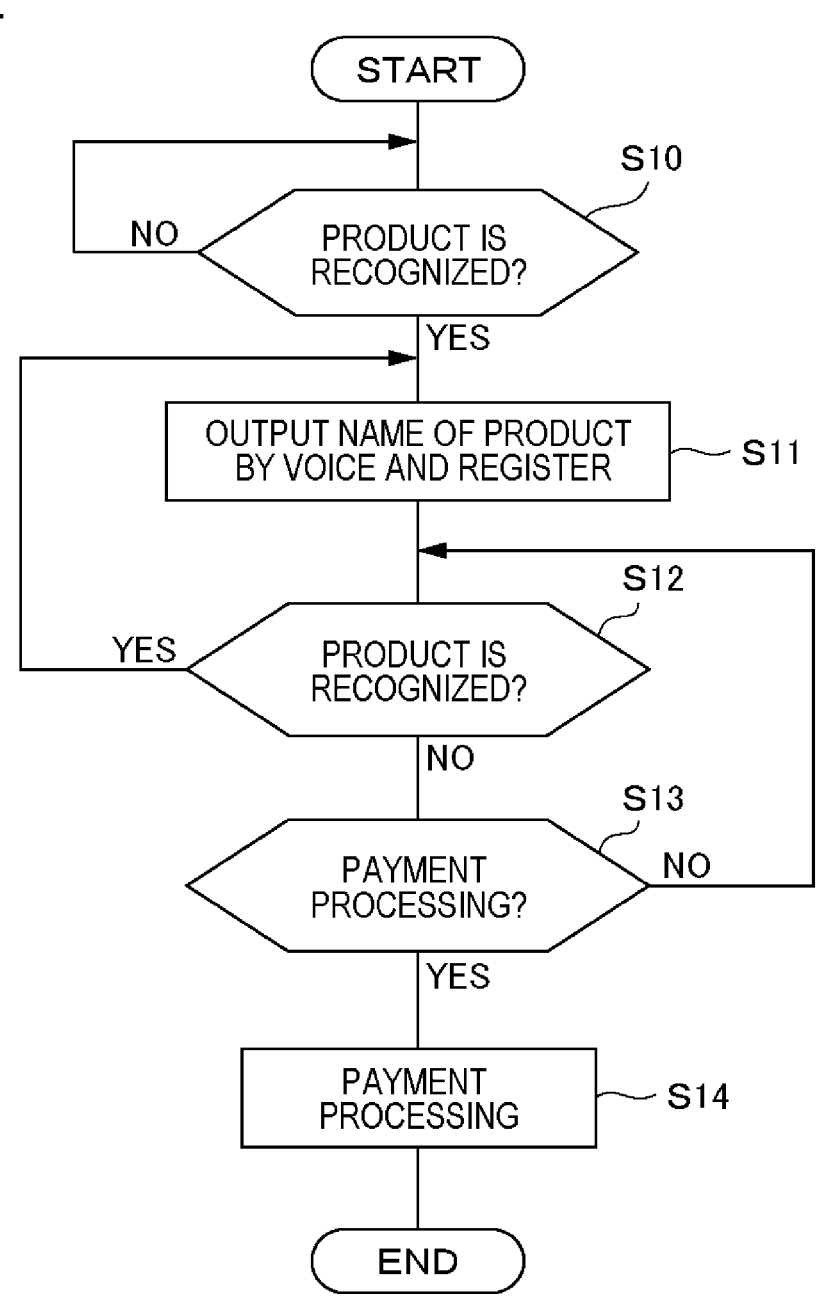
FIG. 4 is a flowchart showing an example of a flow of processing of the registration apparatus of the present example embodiment.

Next, an example of a flow of processing of the registration apparatus 10 of the present example embodiment will be described referring to a flowchart of FIG. 4.

In a case where the processing is started, the image acquisition unit 11 starts acquisition of an image from the camera. Then, the analysis unit 12 starts analysis of the image.

In a case where a product is recognized by the analysis unit 12 (in S10, Yes), the output unit 13 outputs a name of the recognized product by voice (S11). In S11, the registration unit 14 registers the recognized product as a checkout target. Thereafter, in a case where a new product is recognized by the analysis unit 12 (in S12, Yes), the same processing is repeated (S11).

In a case where a new product is not recognized by the analysis unit 12 (in S12, No), and there is an input for payment processing (in S13, Yes), the registration apparatus 10 executes the payment processing (S14). For example, the registration apparatus 10 may receive an input of cash as payment of a total amount of payment computed based on the products already registered and may output change or a receipt as needed. The registration apparatus 10 may receive an input of a credit card, may perform communication with a system of a credit card company, and may perform settlement processing. The registration apparatus 10 may transmit information (information indicating the registered product, a total amount of payment, or the like) for the payment processing to other payment apparatuses.

As above, with the registration apparatus 10 of the present example embodiment that outputs the name of the recognized product by voice, the checkout operator can recognize that the product is recognized and a recognition result, based on voice output from the registration apparatus 10. Furthermore, with the registration apparatus 10 of the present example embodiment that recognizes and registers the product included in the image obtained by imaging the table on which the product is placed, a plurality of products can be placed on the table at a time and can be recognized and registered. As a result, operation efficiency is improved compared to a technique for holding products over a reading window and imaging the products one by one or for making a code reader read a code attached to each product.

Second Example Embodiment

A registration apparatus 10 of the present example embodiment is different from the first example embodiment in that the product is highlighted while the name of the product is being output by voice. Hereinafter, description will be provided in detail.

An example of the hardware configuration of the registration apparatus 10 is the same as in the first example embodiment.

An example of a functional block diagram of the registration apparatus 10 is shown in FIG. 2 as in the first example embodiment. The configurations of the image acquisition unit 11, the analysis unit 12, and the registration unit 14 are the same as in the first example embodiment.

The output unit 13 displays information for highlighting a placed position of a product on the table while the name of the product is being output by voice. Other configurations of the output unit 13 are the same as in the first example embodiment.

Figure 5:
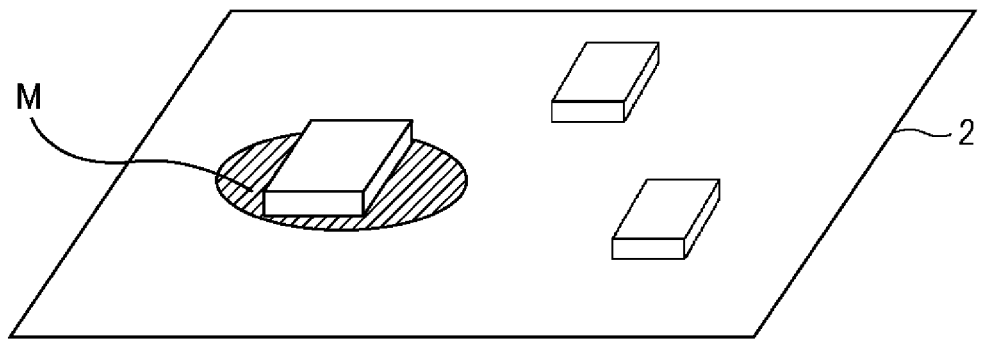
FIG. 5 is a diagram schematically showing an example of information display on the table which is implemented by the registration apparatus of the present example embodiment.
Figure 6:
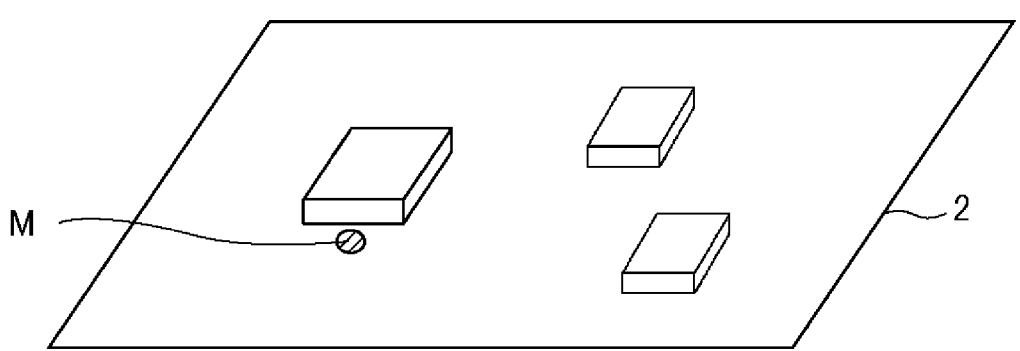
FIG. 6 is a diagram schematically showing an example of information display on the table which is implemented by the registration apparatus of the present example embodiment.

For example, as shown in FIG. 5, the output unit 13 may display a mark M (for example: circle or the like) including a placed position of a product of which the name is being output by voice. In addition, as shown in FIG. 6, the output unit 13 may display a mark M (for example: circle or the like) at a position close to the placed position of the product of which the name is output by voice. It should be noted that information to be displayed is not limited to the mark, and may be other kinds of information, such as letters, numbers, pictures, and mascot characters.

For example, as shown in FIG. 3, in a case where a display (member 2) is provided as a part of the table 1, and a display surface of the display (member 2) is the placement surface, the output unit 13 can display information for highlighting a placed position of a predetermined product on the display. As another example, the output unit 13 may project information for highlighting a placed position of a predetermined product onto the placement surface of the table using a projection apparatus.

The output unit 13 holds a conversion rule for converting "coordinates of an image" into "coordinates of a display region of the display constituting the placement surface of the table" in advance. Then, the output unit 13 converts a position (coordinates) of an object in the image into coordinates of the display region of the display based on the conversion rule and displays information for highlighting a placed position of a predetermined product, for example, so as to surround the converted position or to be close to the position.

Similarly, the output unit 13 may hold a conversion rule for converting "coordinates of an image" into "coordinates of a projection region of a projection apparatus" in advance. Then, the output unit 13 may convert a position (coordinates) of an object in the image into coordinates of a projection region of the projection apparatus based on the conversion rule and may project information for highlighting a placed position of a predetermined product, for example, so as to surround the converted position or to be close to the position.

The coordinates of the image are indicated by a coordinate system in which any position in the image is determined as the origin and any directions are determined as the x-axis direction and the y-axis direction. The coordinates of the display region of the display are indicated by a coordinate system in which any position in the display region is determined as the origin and any directions are determined as the x-axis direction and the y-axis direction. The coordinates of the projection region of the projection apparatus are indicated by a coordinate system in which any position in the projection region is determined as the origin and any directions are determined as the x-axis direction and the y-axis direction.

An example of a flow of processing of the registration apparatus 10 of the present example embodiment is the same as in the first example embodiment.

With the registration apparatus 10 of the present example embodiment described above, the same advantageous effects as in the first example embodiment can be achieved. Furthermore, with the registration apparatus 10 of the present example embodiment that can highlight the product while the name of the product is being output by voice, even though a plurality of products are placed on the table, the operator can intuitively recognize a product of which the recognition result is output. As a result, the operator can accurately perform confirmation about whether or not the recognition result is correct.

Third Example Embodiment

A registration apparatus 10 of the present example embodiment is different from the first and second example embodiments in that, while names are not output for all of the recognized products by voice, the names of a part of the products are output by voice. Hereinafter, description will be provided in detail.

An example of the hardware configuration of the registration apparatus 10 is the same as in the first and second example embodiments.

An example of a functional block diagram of the registration apparatus 10 is shown in FIG. 2 as in the first and second example embodiments. The configurations of the image acquisition unit 11, the analysis unit 12, and the registration unit 14 are the same as in the first and second example embodiments.

The output unit 13 determines whether or not a product recognized by the analysis unit 12 is a product to be a voice processing target. Then, in a case where the product recognized by the analysis unit 12 is a product to be a voice processing target, the output unit 13 outputs a name of the recognized product by voice. It should be noted that, in a case where the product recognized by the analysis unit 12 is not a product to be a voice processing target, the output unit 13 does not output the name of the recognized product by voice. Other configurations of the output unit 13 are the same as in the first and second example embodiments.

For example, a first list (see FIG. 10) in which products to be a voice processing target are registered may be generated in advance and stored in the registration apparatus 10 or an external apparatus that can perform communication with the registration apparatus 10. Then, in a case where a product recognized by the analysis unit 12 is registered in the first list, the output unit 13 may determine that the product is a product to be a voice processing target. In contrast, in a case where a product recognized by the analysis unit 12 is not registered in the first list, the output unit 13 may determine that the product is not a product to be a voice processing target.

In addition, a second list (see FIG. 11) in which products to be not a voice processing target are registered may be generated and stored in the registration apparatus 10 or an external apparatus that can perform communication with the registration apparatus 10. Then, in a case where a product recognized by the analysis unit 12 is not registered in the second list, the output unit 13 may determine that the product is a product to be a voice processing target. In contrast, in a case where a product recognized by the analysis unit 12 is registered in the second list, the output unit 13 may determine that the product is not a product to be a voice processing target.

It should be noted that the first list and the second list may be prepared on a store side in advance or may be generated by the operator of the registration apparatus 10 every time. Here, an example of processing in which the operator of the registration apparatus 10 generates the lists every time will be described.

Figure 8:
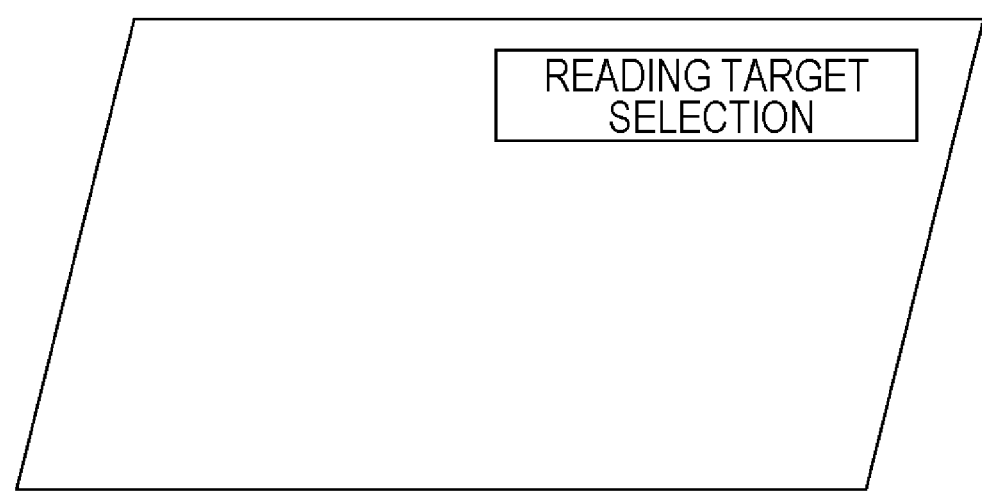
FIG. 8 is a diagram schematically showing an example of information that is displayed on a display.
Figure 9:
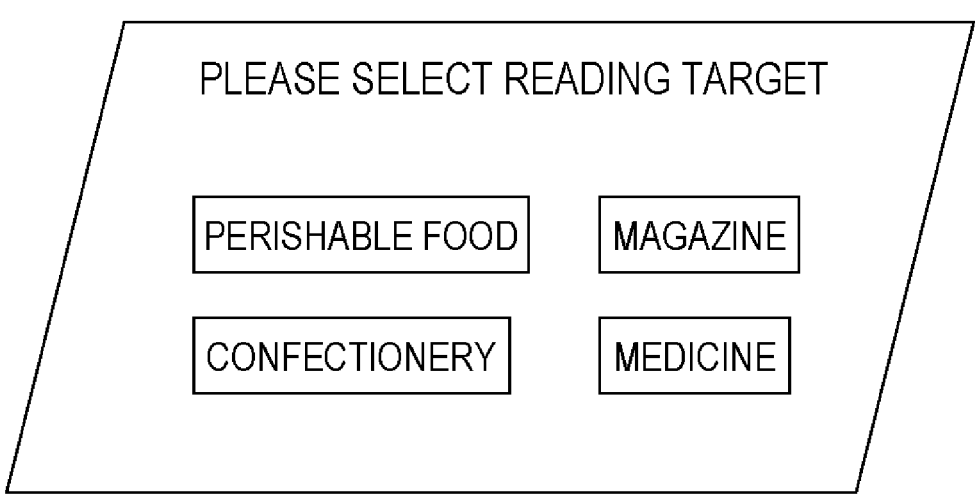
FIG. 9 is a diagram schematically showing an example of information that is displayed on the display.

For example, a button shown in FIG. 8 may be displayed on a touch panel display that can be operated by the operator of the registration apparatus 10. The button is associated with text "reading target selection". Then, in a case where a touch operation (for example: tap operation) on the button is received, transition may be made to a screen shown in FIG. 9. On the screen shown in FIG. 9, buttons corresponding to a plurality of product categories are displayed. In a case where a touch operation (for example: tap operation) on a button is received, the product category corresponding to the button is registered as a voice processing target (reading target). As a result, a first list is generated. It should be noted that the generation of the second list can be implemented by the same means. In this way, products to be a voice processing target can be decided in conformity with the needs of each customer. It should be noted that the touch panel display described herein may be the above-described member 2.

The name of the product output by voice is likely to be heard not only by a customer who purchases the product but also by other customers. Then, among products, there are products for which information regarding purchase is not preferable to be known to other customers. According to the example where determination can be made in advance whether or not each product is a voice processing target, inconvenience that information undesired to be known to other customers leaks to other customers can be suppressed.

In addition, the output unit 13 may determine a product having the reliability of the recognition result lower than a reference value among the products recognized by the analysis unit 12 as a product to be a voice processing target. In this case, the output unit 13 does not determine a product having the reliability of the recognition result equal to or higher than the reference value among the products recognized by the analysis unit 12 as a product to be a voice processing target. The reliability may be similarity (similarity between the recognized product and the object included in the image) computed by pattern matching. For example, the analysis unit 12 can compute the similarity.

In such a case, a product of which the reliability is low and for which it is desirable for the operator to perform confirmation or the like about whether or not the recognition result is correct can be informed to the operator by voice.

In addition, the output unit 13 may determine a product, of which the product attribute satisfies a predetermined condition, among the products recognized by the analysis unit 12 as a product to be a voice processing target. In this case, the output unit 13 does not determine a product, of which the product attribute does not satisfy the predetermined condition, among the products recognized by the analysis unit 12 as a product to be a voice processing target.

The predetermined condition may be a condition that "a product is an expensive product (a product has a price equal to or higher than a reference value)". The expensive product can be significantly affected by product misrecognition. A product for which, under the predetermined condition, product misrecognition is likely to have a significant effect and it is desirable for the operator to perform confirmation or the like about whether or not the recognition result is correct can be informed to the operator by voice.

In addition, the predetermined condition may be a condition that "there are products of the same kind having different sizes (for example: capacity)". Such products include, for example, beverages that are sold at a plurality of sizes, such as 350 ml cans and 500 ml cans, while having the same kind of content. The products of the same kind having different sizes are highly likely to have the same or similar appearance design, and as a result, the products are likely to be erroneously recognized in product recognition in image analysis. A product for which, under the predetermined condition, product misrecognition is comparatively highly likely to occur and it is desirable for the operator to perform confirmation or the like about whether or not the recognition result is correct can be informed to the operator by voice.

In addition, the predetermined condition may be a condition that "a product has a large size (a product has a capacity equal to or greater than a reference value)". A large product is likely to be an expensive product. Then, the expensive product can be significantly affected by product misrecognition. A product for which, under the predetermined condition, product misrecognition is likely to have a significant effect and it is desirable for the operator to perform confirmation or the like about whether or not the recognition result is correct can be informed to the operator by voice.

Figure 7:
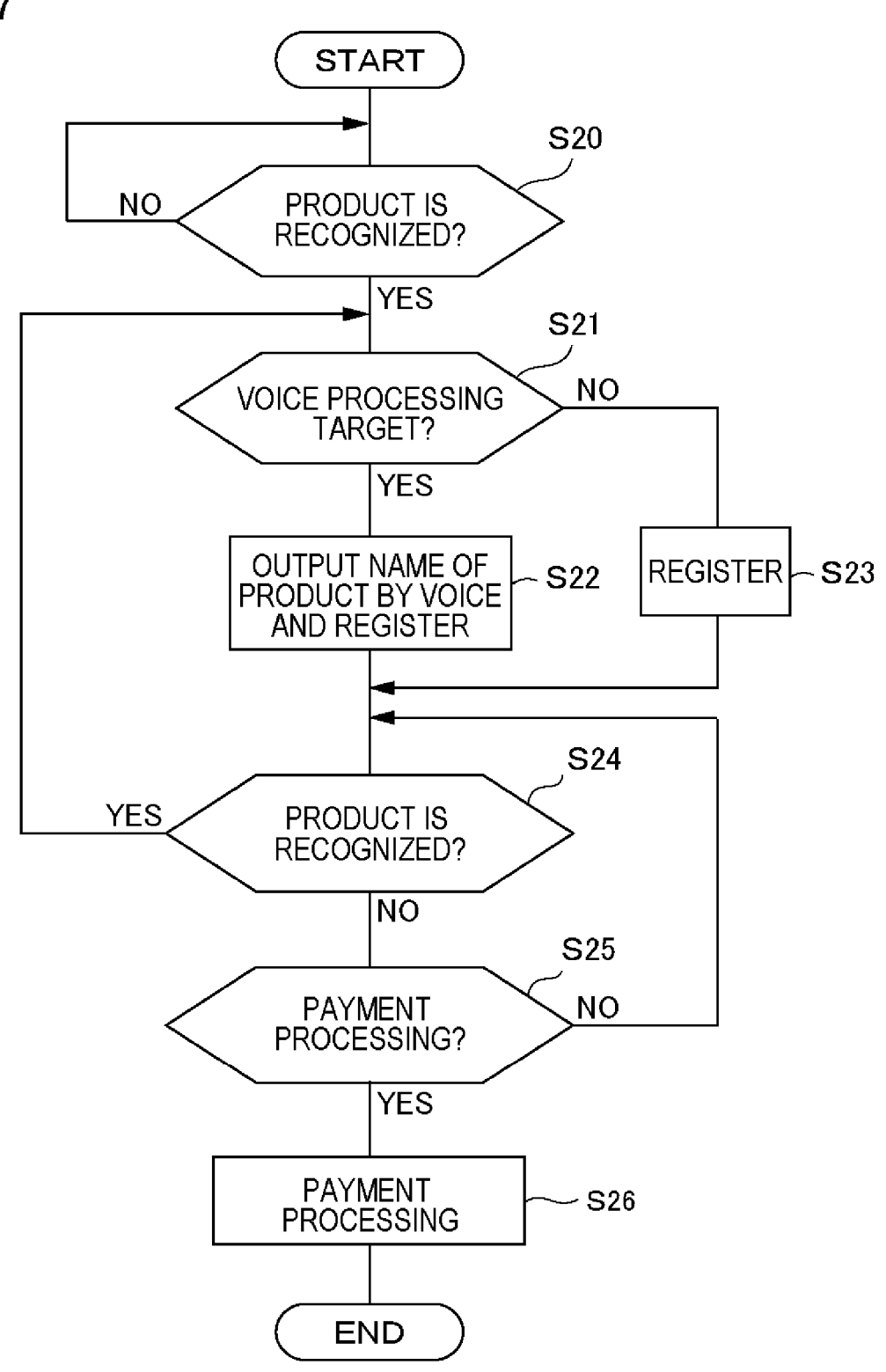
FIG. 7 is a flowchart showing an example of a flow of processing of the registration apparatus of the present example embodiment.

Next, an example of a flow of processing of the registration apparatus 10 of the present example embodiment will be described referring to a flowchart of FIG. 7.

In a case where the processing is started, the image acquisition unit 11 starts acquisition of an image from the camera. Then, the analysis unit 12 starts analysis of the image.

In a case where a product is recognized by the analysis unit 12 (in S20, Yes), the output unit 13 determines whether or not the product recognized by the analysis unit 12 is a product to be a voice processing target (S21).

In a case where the recognized product is a product to be a voice processing target (in S21, Yes), the output unit 13 outputs a name of the recognized product by voice, and the registration unit 14 registers the recognized product as a checkout target (S22).

In contrast, in a case where the recognized product is not a product to be a voice processing target (in S21, No), the registration unit 14 registers the recognized product as a checkout target, while the output unit 13 does not output the name of the recognized product by voice (S23).

Thereafter, in a case where a new product is recognized by the analysis unit 12 (in S24, Yes), the process returns to S21 and the same processing is repeated.

In a case where a new product is not recognized by the analysis unit 12 (in S24, No), and there is an input for payment processing (in S25, Yes), the registration apparatus 10 executes the payment processing (S26). For example, the registration apparatus 10 may receive an input of cash as payment of a total amount of payment computed based on the products already registered and may output change or a receipt as needed. The registration apparatus 10 may receive an input of a credit card, may perform communication with a system of a credit card company, and may perform settlement processing. The registration apparatus 10 may transmit information (information indicating the registered product, a total amount of payment, or the like) for the payment processing to other payment apparatuses.

With the registration apparatus 10 of the present example embodiment described above, the same advantageous effects as in the first and second example embodiments can be achieved. Furthermore, with the registration apparatus 10 of the present example embodiment that outputs the names of a part of the recognized products by voice instead of outputting the names of all of the products by voice, various advantageous effects can be achieved. For example, inconvenience that information regarding purchase of a certain product is known to other customers can be suppressed, and a product for which it is desirable for the operator to perform confirmation or the like about whether or not the recognition result is correct can be informed to the operator by voice.

Fourth Example Embodiment

A registration apparatus 10 of the present example embodiment is different from the first to third example embodiments in that a timing of outputting a name of a recognized product by voice or the like is embodied. Hereinafter, description will be provided in detail.

An example of the hardware configuration of the registration apparatus 10 is the same as in the first to third example embodiments.

An example of a functional block diagram of the registration apparatus 10 is shown in FIG. 2 as in the first to third example embodiments. The configurations of the image acquisition unit 11, the analysis unit 12, and the registration unit 14 are the same as in the first to third example embodiments.

The output unit 13 can output the names of the products recognized by the analysis unit 12 by voice in various aspects. Other configurations of the output unit 13 are the same as in the first to third example embodiments.

Example 1

The output unit 13 outputs the names of the products by voice in the order in which the products are recognized by the analysis unit 12. For example, after a product is recognized by the analysis unit 12, the name of the product may be output by voice accordingly. Then, while a name of a first product is being output by voice, in a case where another product is recognized by the analysis unit 12, the output unit 13 interrupts processing for outputting a name of the first product by voice accordingly, and starts processing for outputting a name of the another product by voice.

Even though the whole name of the product is not output by voice, the name of the product that is output by voice may be recognized only with a part thereof. Nevertheless, in a case where the whole name of the product is output by voice, a lot of time is needed. As a result, there is a customer who feels troublesome in an output of the whole name of the product. According to the example, in a case where a new product is placed on the table, the names of the products that are output by voice can be switched one after another accordingly. That is, the names of the products that are output by voice can be switched in conformity with a pace at which the products are placed on the table. As a result, a voice output in conformity with an operation pace of the operator is achieved.

Example 2

The output unit 13 outputs the names of the products by voice in the order in which the products are recognized by the analysis unit 12. For example, after a product is recognized by the analysis unit 12, the name of the product may be output by voice accordingly. Then, while the name of the first product is being output by voice, in a case where another product is recognized by the analysis unit 12, the output unit 13 executes the following processing.

In a case where a predetermined proposition (for example: 50%) or more of the name of the first product has been output by voice when another product is recognized by the analysis unit 12, the output unit 13 interrupts the processing for outputting the name of the first product by voice in response to the recognition of the another product, and starts the processing for outputting the name of the another product by voice. The predetermined proportion may be defined by the number of letters of the name of a product or may be defined by a length of a voice file.

In contrast, in a case where the predetermined proportion (for example: 50%) or more of the name of the first product has not been output by voice when another product is recognized by the analysis unit 12, the output unit 13 continues a voice output of the name of the first product until the predetermined proportion (for example: 50%) of the name of the first product is output by voice. Then, when the predetermined proportion (for example: 50%) of the name of the first product is output by voice, the processing for outputting the name of the first product by voice is interrupted, and the processing for outputting the name of the another product by voice is started.

It should be noted that the above-described predetermined proportion may be determined in advance for each product or may be different for each product.

According to Example 2, the same advantageous effects as in Example 1 can be achieved. Furthermore, since an output of the name of the product of the predetermined proportion or more can also be secured, the voice output of the name of the product is interrupted in the middle, whereby inconvenience that the name of the product cannot be recognized can be suppressed.

Example 3

In a case where a product is recognized by the analysis unit 12, the output unit 13 may output a name of the product by voice accordingly. In such a case, time loss until the name of the product is output by voice after the product is placed on the table can be decreased. As a result, the customer can perform an operation without feeling a sense of discomfort.

Example 4

In a case where a new product is not recognized by the analysis unit 12 for a given time or more after a product is recognized by the analysis unit 12, the output unit 13 may output a name of the recognized product by voice. In such a case, a voice output can be started after the customer has finished placing. That is, it is possible to avoid an output of voice while the customer is performing an operation to place products. As a result, inconvenience that the customer is preoccupied with the placing operation and cannot confirm the content of output voice can be suppressed.

An example of a flow of processing of the registration apparatus 10 of the present example embodiment is the same as in the first to third example embodiments.

With the registration apparatus 10 of the present example embodiment described above, the same advantageous effects as in the first to third example embodiments can be achieved. Furthermore, with the registration apparatus 10 of the present example embodiment that is characterized by the timing of outputting the name of the recognized product by voice, as described above, various advantageous effects according to the aspects can be implemented.

Here, a modification example that can be applied to all example embodiments will be described. The registration apparatus 10 may have a switching unit that turns on or off "the processing for outputting the name of the recognized product by voice" of the output unit 13. The switching unit can switch on and off according to a user input. The customer that feels troublesome in an output of the name of the recognized product by voice can operate the registration apparatus 10 and can perform off setting, thereby avoiding an output of the name of the recognized product by voice.

In addition, before placing a product, for which information regarding purchase is undesired to be known to other customers, on the table, the customer can operate the registration apparatus 10 and can perform off setting. In such a case, it is possible to avoid an output of the name of the product by voice. Thereafter, the customer can operate the registration apparatus 10 and can perform on setting. As a result, a subsequent recognition result can be confirmed by voice. In this way, according to the modification example, a user-friendly configuration can be achieved.

Another modification example that can be applied to all example embodiments will be described. Although recognition is made by the analysis unit 12 that an object is placed on the table, in a case where identification is not made about what product the object is (in a case where a product is not recognized), the output unit 13 may output information indicating the effect. Information may be output by voice, may be displayed on the table by the same method as described in the second example embodiment, or may be implemented by display on a display different from the display constituting the placement surface of the table. A case where a product is not recognized may be, for example, a case where there is no product of which similarity is equal to or greater than the reference value.

The output unit 13 may output, for example, information that "there is an unrecognizable product". In this case, the output unit 13 may highlight an object that is unrecognizable as a product. A method of highlighting may be the same as described in the second example embodiment. In this way, the customer can easily recognize that there is an unrecognizable product and the unrecognizable product.

The output unit 13 may output, for example, a guidance of a countermeasure "Please read barcode of unrecognizable product with built-in barcode reader", or the like. According to the modification example, a user-friendly configuration in which the user can efficiently proceed with an operation can be achieved.

Another modification example that can be applied to all example embodiments will be described. The output unit 13 may output information indicating the number of objects that are placed on the table at this time and recognized as products by the analysis unit 12. Information may be output by voice, may be displayed on the table by the same method as described in the second example embodiment, or may be implemented by display on a display different from the display constituting the placement surface of the table. According to the modification example, the customer can recognize the recognition result.

Hereinafter, examples of reference example embodiments will be added below.

1. A registration apparatus including:

an image acquisition unit that acquires an image obtained by imaging a placement surface of a table, on which a product is placed;

an analysis unit that recognizes the product included in the image;

a registration unit that registers the recognized product as a checkout target; and an output unit that outputs a name of the recognized product by voice.

2. The registration apparatus described in 1, in which the output unit displays information for highlighting a placed position of the product on the table while the name of the product is being output by voice.

3. The registration apparatus described in 1 or 2, in which the output unit determines whether or not the recognized product is a product to be a voice processing target, and in a case where the recognized product is the product to be the voice processing target, outputs the name of the recognized product by voice.

4. The registration apparatus described in 3, in which the output unit determines the product having reliability of a recognition result lower than a reference value among the recognized products as the product to be the voice processing target.

5. The registration apparatus described in 3, in which the output unit determines the product registered in a list, in which the products to be a voice processing target are registered, as the product to be the voice processing target.

6. The registration apparatus according to 3, in which the output unit determines the product not registered in a list, in which the products to be not a voice processing target are registered, as the product to be the voice processing target.

7. The registration apparatus described in 3, in which the output unit determines the product, of which a product attribute satisfies a predetermined condition, among the recognized products as the product to be the voice processing target.

8. The registration apparatus described in any one of 1 to 7, in which, while a name of a first product is being output by voice, in a case where another product is recognized, the output unit interrupts processing for outputting the name of the first product by voice, and starts processing for outputting a name of the other product by voice.

9. A registration method executed by a computer, the method including:

an image acquisition step of acquiring an image obtained by imaging a placement surface of a table, on which a product is placed;

an analysis step of recognizing the product included in the image;

a registration step of registering the recognized product as a checkout target; and an output step of outputting a name of the recognized product by voice.

10. A program that causes a computer to function as:

an image acquisition unit that acquires an image obtained by imaging a placement surface of a table, on which a product is placed;

an analysis unit that recognizes the product included in the image;

a registration unit that registers the recognized product as a checkout target; and an output unit that outputs a name of the recognized product by voice.

The invention claimed is:

1. A registration apparatus comprising:

at least one memory configured to store one or more instructions; and at least one processor configured to execute the one or more instructions to:

acquire an image obtained by imaging a placement surface of a table, on which a product is placed;

recognize, as a recognized product, the product included in the image;

determine whether the recognized product satisfies a predetermined condition, the predetermined condition including:

a reliability of a recognition result of the recognized product is lower than a first reference value, a price of the recognized product is equal to or higher than a second reference value, and whether there exists an other product that is different from the recognized product, is of a same kind as the recognized product, and has a different size from the recognized product; and output a name of the recognized product by voice when the recognized product satisfies the predetermined condition.

2. The registration apparatus according to claim 1, wherein the at least one processor is further configured to execute the one or more instructions to:

register the recognized product as a checkout target.

3. The registration apparatus according to claim 1, wherein the at least one processor is further configured to execute the one or more instructions to:

display information for highlighting a placed position of the product on the table while the name of the product is being output by voice.

4. The registration apparatus according to claim 1, wherein the at least one processor is further configured to execute the one or more instructions to:

determine whether the recognized product is on a list of products to be a voice processing target; and output the name of the recognized product by voice when the recognized product is on the list.

5. The registration apparatus according to claim 4, wherein the at least one processor is further configured to execute the one or more instructions to:

receive, by user operation, selection of target product to be output by voice; and generate the list as further including information of the target product.

6. The registration apparatus according to claim 1, wherein the at least one processor is further configured to execute the one or more instructions to:

while a name of a first product is being output by voice, in response to recognition of the other product, interrupt processing for outputting the name of the first product by voice, and start processing for outputting a name of the other product by voice.

7. A registration method executed by a computer, the registration method comprising:

acquiring an image obtained by imaging a placement surface of a table, on which a product is placed;

recognizing, as a recognized product, the product included in the image;

determining whether the recognized product satisfies a predetermined condition, the predetermined condition including:

a reliability of a recognition result of the recognized product is lower than a first reference value, a price of the recognized product is equal to or higher than a second reference value, and whether there exists an other product that is different from the recognized product, is of a same kind as the recognized product, and has a different size from the recognized product; and outputting a name of the recognized product by voice when the recognized product satisfies the predetermined condition.

8. The registration method according to claim 7, wherein the computer registers the recognized product as a checkout target.

9. The registration method according to claim 7, wherein the computer displays information for highlighting a placed position of the product on the table while the name of the product is being output by voice.

10. The registration method according to claim 7, wherein the computer:

determines whether the recognized product is on a list of products to be a voice processing target; and outputs the name of the recognized product by voice when the recognized product is on the list.

11. The registration method according to claim 10, wherein the computer:

receives, by user operation, selection of target product to be output by voice; and generates the list as further including information of the target product.

12. The registration method according to claim 7, wherein the computer:

while a name of a first product is being output by voice, in response to recognition of the other product, interrupts processing for outputting the name of the first product by voice, and starts processing for outputting a name of the other product by voice.

13. A non-transitory storage medium storing a program that causes a computer to:

acquire an image obtained by imaging a placement surface of a table, on which a product is placed;

recognize, as a recognized product, the product included in the image;

determine whether the recognized product satisfies a predetermined condition, the predetermined condition including:

a reliability of a recognition result of the recognized product is lower than a first reference value, a price of the recognized product is equal to or higher than a second reference value, and whether there exists an other product that is different from the recognized product, is of a same kind as the recognized product, and has a different size from the recognized product; and output a name of the recognized product by voice when the recognized product satisfies the predetermined condition.

14. The non-transitory storage medium according to claim 13, wherein the program further cause the computer to register the recognized product as a checkout target.

15. The non-transitory storage medium according to claim 13, wherein the program further cause the computer to display information for highlighting a placed position of the product on the table while the name of the product is being output by voice.

16. The non-transitory storage medium according to claim 13, wherein the program further cause the computer to:

determine whether the recognized product is on a list of products to be a voice processing target; and output the name of the recognized product by voice when the recognized product is on the list.

17. The non-transitory storage medium according to claim 16, wherein the program further cause the computer to:

receive, by user operation, selection of target product to be output by voice; and generate the list as further including information of the target product.

\* \* \* \* \*